July 10, 1934.  E. E. PETTINGELL  1,965,906
MOTION PICTURE AND MUSIC SYNCHRONIZING DEVICE
Original Filed June 18, 1928    2 Sheets-Sheet 1
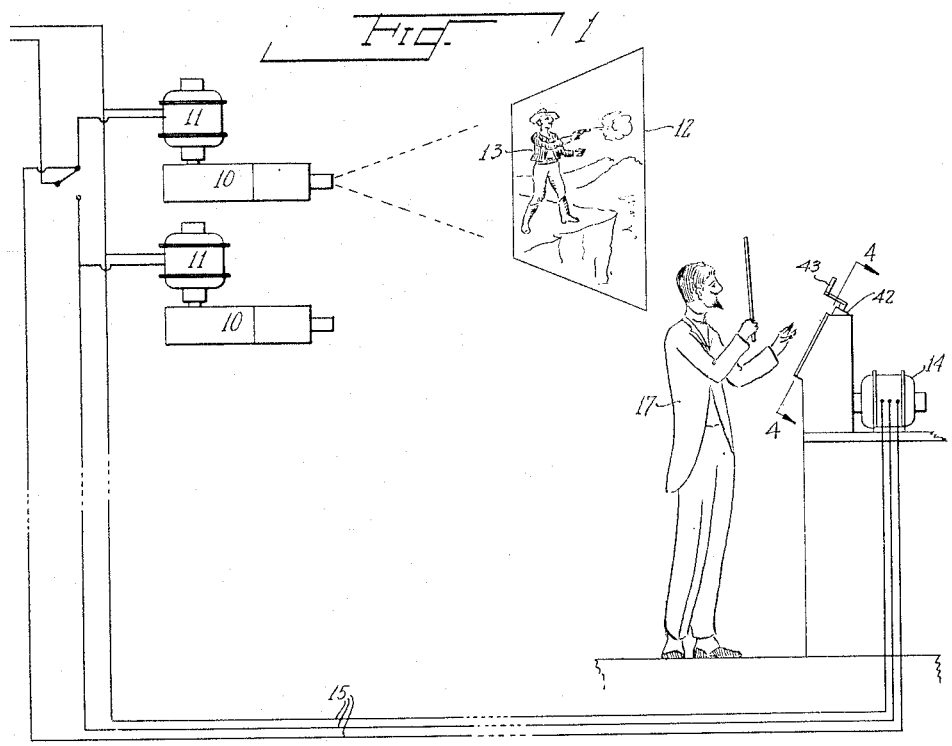
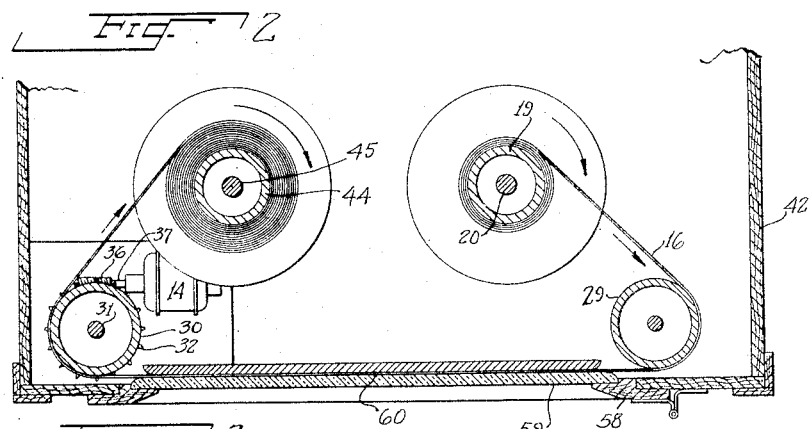
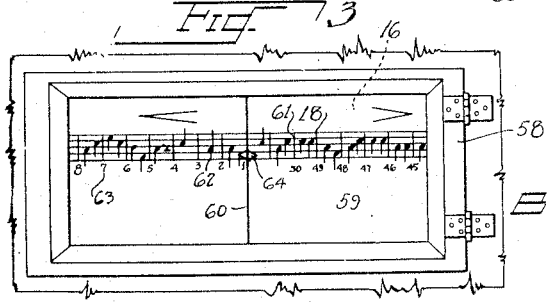

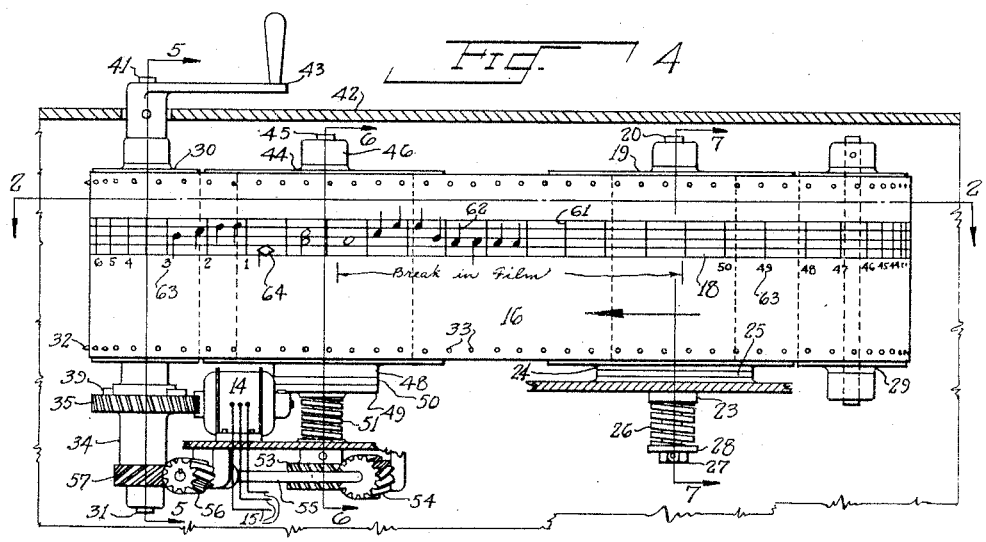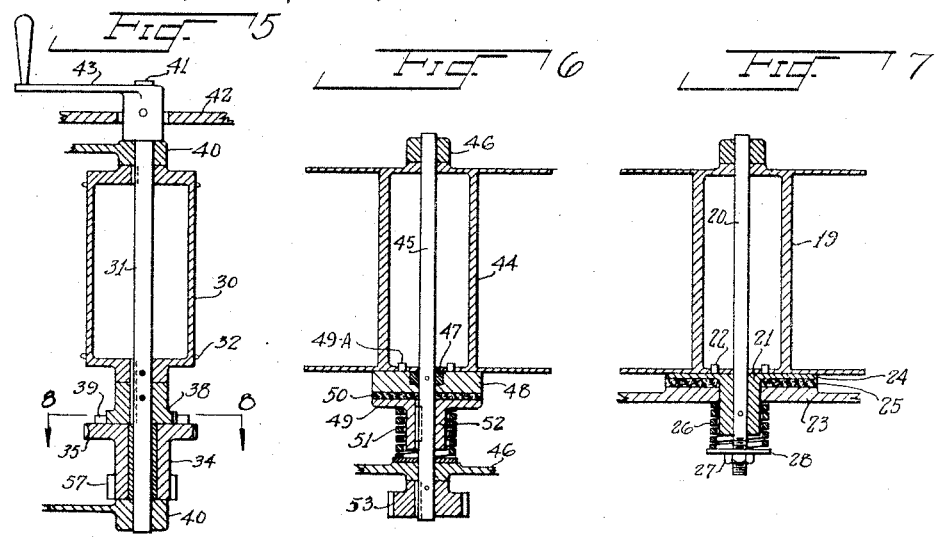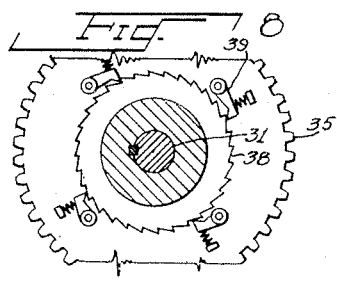

Patented July 10, 1934

1,965,906

UNITED STATES PATENT OFFICE 1,965,906

MOTION PICTURE AND MUSIC SYNCHRONIZING DEVICE

Elmer E. Pettingell, Portland, Oreg.

Application June 18, 1928, Serial No. 286,129
Renewed January 23, 1934

2 Claims. (Cl. 88—16)

This invention relates generally to the motion picture industry, and particularly to the rendition of music scores, including vocal numbers and speaking dramatic lines in synchronism with the action of a motion picture.

The main object of this invention is to accurately indicate and express to the conductor of a motion picture theater orchestra or organist without his having to watch the picture, the correct tempo of the various pieces or changes of music comprising the music score which accompanies the screening of the motion picture for which said music score has been composed or arranged, thereby accurately synchronizing with the successive changes of scene and action in the picture the particular music, modulation, cue or effect composed or designed for each such change of scene or action, thereby rendering possible the use of a greater number of appropriate changes of tempo and melody, modulations, cues and effects than formerly possible to use in the composition or arrangement of such music score.

The second object is to secure a higher degree of perfection in the interpretation of motion picture music by enabling the conductor or organist to devote his undivided attention to the rendition of the music of the score without having to constantly watch the picture for the purpose of synchronizing the music therewith.

The third object is to synchronize spoken words and dramatic lines with the movement of the lips of the actors speaking same in the picture.

The fourth object is to synchronize music rolls to motion pictures played by player-pianos, photo-players and other automatic music playing devices.

These, and other objects, will become more apparent from the specification following as illustrated in the accompanying drawings, in which:

Figure 1 is a somewhat diagrammatic view showing the relation between the motion picture apparatus, the screen on which the picture is shown and the mechanism employed by the orchestra leader. Figure 2 is a horizontal section through the score-handling mechanism taken along the line 2—2 in Figure 4. Figure 3 is a front elevation of the score-handling mechanism as seen by the conductor. Figure 4 is a front elevation of the score-handling mechanism with the door and its casing removed and the remainder of the casing broken away in section. Figure 5 is a section taken along the line 5—5 in Figure 4. Figure 6 is a section taken along the line 6—6 in Figure 4. Figure 7 is a section taken along the line 7—7 in Figure 4. Figure 8 is an enlarged section through the ratchet mechanism taken along the line 8—8 in Figure 5.

Similar numbers of reference refer to similar parts throughout the several views.

Referring in detail to the drawings, in order to illustrate this invention there is shown a pair of the usual projecting machines 10 each of which is operated by a synchronous motor 11. A screen 12 is also indicated upon which is shown a picture 13 from either of the projectors 10. Wired in parallel with the motors 11 is a synchronous motor 14 which is supplied with electric energy from the same circuit as are the motors 11 through the wires 15. The score 16 used by the conductor 17 is in web form and need have nothing more than the single staff 18 written thereon, the details of which will be described later.

The score 16 is wound on a reel 19 which is mounted on a shaft 20, near one end of which is pinned a flanged hub 21 whose pins 22 form a driving connection with the reel 19. The hub 21 journals in the bearing 23, between which bearing and the hub flange 24 is placed a friction washer 25. A spring 26 is placed around the hub 21 and the tension regulated by means of a nut 27 which is threaded on the shaft 20, which nut bears against the washer 28. The reel 19 is not a driving member but is a retarding element for the score 16.

From the reel 19 the score 16 passes around an idler roll 29 and then around the drive roll 30, which is pinned on the shaft 31. The drive roll 30 is provided with projections 32 which register with openings 33 on the score 16. On the shaft 31 is loosely mounted a sleeve 34 on which is formed a worm wheel 35 which meshes with a worm 36 on the shaft 37 of the synchronous motor 14. Alongside of the worm wheel 35 and pinned to the shaft 31 is a ratchet wheel 38 adapted to be engaged by the pawls 39 on the side of the worm wheel 35. It is preferable to so position the pawls 39 that one of them will engage a tooth in the wheel 38 at one time, the others having intermediate positions which will give the effect of a much finer toothed ratchet without using objectionably small teeth, as is well understood. Bearings 40 are provided for the shaft 31 whose end 41 projects through the casing 42 and is provided with a crank 43 whereby the score sheet can be advanced independently of the motor 14.

After leaving the roll 30 the score 16 passes around a winding reel 44 which is mounted on the shaft 45 which journals in the bearings 46. On the shaft 45 is pinned a collar 47 against which is placed a disk 48 provided with pins 49—A which form a driving connection with the winding reel 44. Splined on the shaft 45 is a friction disk 49 between which and the disk 48 is placed a friction washer 50. A spring 51 on the hub 52 of the disk 49 urges the members 48 and 49 into frictional engagement.

On the shaft 45 is pinned a helical gear 53 which meshes with a second helical gear 54, whose shaft 55 is provided with a third helical gear 56 which meshes with a fourth helical gear 57 which is formed on the sleeve 34. In other words—the sleeve 34 drives the roll 30, and the ratio of the drive is such that even when the diameter of the score roll on the reel 44 is smallest, there will be a slippage between the members 48 and 49 for the purpose of maintaining a suitable tension on the score 16, although the driving is actually performed by the roll 30.

The casing 42 is provided with a front door 58 whose glass 59 is provided with an upright indicator line 60, which may either be marked on the glass itself or by means of a wire or thread stretched vertically between the upper and lower edges of the glass 59.

Turning again to the music score in Figures 3 and 4 it will be noticed that the staff 18 is divided into bars or measures by the bar lines 61 in precisely the same manner as in ordinary music, and that the notes 62 are identical with those ordinarily used. The conductor is the only member of the orchestra who reads from the synchronizer; all other members of the orchestra read their parts from the usual sidemen's books and depend entirely upon the conductor for tempos.

To indicate a desired tempo the notes 62 are written on the score 16 and spaced at such distances apart that the time required for each note to arrive at the indicator line 60, after the arrival of the next preceding note, will exactly equal the musical value or duration of the notes when played at the desired tempo. The conductor reads and conducts or plays each note of the music as it arrives at the indicator line 60.

Taking for example 2/4 time (two quarter notes in each measure) and that the notes are spaced at equal distances from one another and are played as each one reaches the indicator line 60, a certain even cadence or tempo will be established. If the space between the notes is decreased the playing of the notes will be faster, hence, the tempo will be increased. If the space between the notes is increased, the tempo will be slower or decreased. If the spacing between the notes is gradually decreased, an accelerando will occur and if the spacing between the notes is gradually increased, a rallentando will occur. Thus any tempo may be established and varied at will.

The cadence for speaking dramatic lines will be indicated in the same manner, although the dramatic reader will use a separate synchronizer with the dramatic lines written on the web thereof and spaced thereon to indicate the exact time each word and syllable is to be spoken. Separate synchronizers for singers will not be necessary as the tempo of the singing will be regulated by the musical accompaniment, except when the enunciation of the singer is required to synchronize perfectly with the movement of the lips and gestures of a singer in the motion picture.

The spacing of the notes is determined as follows: Take, for example, a scene or portion of the narrative of the picture, the individual pictures, or "frames" as they are called, composing this part of the film, are counted. That amount of space on the web 16 which corresponds with that number of frames is measured and marked off. The length of time consumed by this amount of space in passing the indicator line 60 is calculated, and the number of measures of the music selected to accompany this scene, or portion of the film, which can be played at its proper tempo within said length of time, is ascertained and the marked-off portion on the web 16 is divided into that many spaces, which will now be called measures, and these measures are subdivided into as many subdivisions as the tempo of the music is mathematically susceptible of, and each note or rest is written on the extreme left edge of its respective subdivision; the musical value or duration thereof extending from left to right on the web 16, which is moving from right to left.

It is unnecessary for the conductor to hold his orchestra in rigid synchronism with the picture all of the time. It is only necessary to register accurately with the picture at certain points, such as changing or modulating from one movement to another, and where cues and climaxes occur. At other times the conductor may be reading ahead or behind the indicator line. In such case the conductor is warned of the approach of a cue or climax by the numbers 63 in time to enable him to so increase or diminish the tempo as to bring the orchestra into perfect synchronism with the picture by the time the cue or climax 64 arrives at the indicator 60.

It can thus be seen that a large portion of the strain ordinarily imposed on an orchestra leader is removed and the quality of the performance greatly improved.

The operation of the device is as follows: The motion picture film and the music score web 16 are driven by synchronous motors in the same circuit and controlled by the same rheostat, hence, if the rheostat is advanced to increase the speed of the projection machine motor, as is frequently done, the speed of the synchronizer motor will be simultaneously increased to exactly the same speed. If the speed of the projection machine motor is varied by any cause whatever, the speed of the synchronizer motor will be simultaneously varied to the same exact extent, and the relative speed of the film and web will be accurately maintained at all times. It is understood, of course, that the web travels at a much slower speed than that of the film, for obvious reasons. The preferable ratio of the rates of speed of the film and web is estimated as eighteen inches of film passing the aperture of the projection machine to one inch of web passing the indicator line 60.

If, for instance, it should be necessary to delete a portion of the film, due to breakage, censorship or for the purpose of shortening the film to meet some particular requirements, it is only necessary for the leader to operate the crank 43 sufficiently to cause the score to pass the suggested break or omission in the film.

While there is suggested the use of synchronous motors and certain mechanism for causing the musical score to pass before the eyes of the performer at a speed which registers with the showing of the picture on the screen, it is obvious that many equivalent mechanisms could be employed for this purpose without departing from the spirit of this invention.

Synchronizing the changeovers is explained as follows: The average feature picture runs about one hour and twenty-five or thirty minutes and consists of five or six reels of film of about 1000 feet each. Two projection machines are used alternately, each driven by a separate motor. While one machine is running a reel the other machine is threaded up with the next reel and made ready to run.

The music score is written on one reel of paper or web and runs continuously from the beginning to the end of the picture; therefore the following means is provided for synchronizing the second and following reels of film with the music score in making the changeover from one projection machine to the other in running the picture.

The first machine is set to start on a certain marked frame. As soon as the machine attains full speed the dowser opens and the picture appears on the screen. The synchronizer is wired in the same circuit, and the switch which starts the projection machine motor also starts the synchronizer motor. The web in the synchronizer is set at a point just far enough ahead of the first note of the music score to permit the synchronizer to attain full speed before the first note reaches the indicator line. The setting of the film and the web is timed so that the dowser will open just at the time the first note reaches the indicator line, therefore the beginning of the picture and the music must be simultaneous.

As stated in the fourth object of invention, when the above described synchronizing device is employed to control the playing of music from player-pianos, photo-players, etc., the necessary pneumatic attachments (not shown) must be provided in order that the music may be played automatically, instead of under the visual guidance of the conductor, as in the case where the music is actually written upon the roll instead of by perforating same, as is the case with player-piano rolls.

I claim:

1. The combination of a film feeding device having a synchronous motor for operating same and a continuous score feeding device having a synchronous motor for operating same, a continuous score whereon is recorded the music to be played during the showing of the picture the position of each note of said music and its rate of travel causing each note to appear under a guide line in accurate correlation to the picture being shown, and a manually operated compensating device whereby an error of synchronism due to changes in film length can be eliminated at a climax consisting of manually operated means whereby the position of the score may be advanced with relation to said film.

2. A device for synchronizing the showing of motion pictures and the playing of the musical accompaniment therefor, having in combination a picture projecting machine, a musical score sheet in web form having music thereon appropriate for the picture being shown, a web driving reel for moving said web in synchronism with the showing of the picture by said picture machine, means for so driving said web, a frictional retarded unwinding reel for supplying said web to said drive reel, a frictionally driven overdrive for said winding reel for taking up the web from said web-driving mechanism, and a ratchet crank drive for said web-driving reel whereby same may be rotated manually and independently of the synchronized drive for said web.

ELMER E. PETTINGELL.